United States Patent [19]

Reed, Jr. et al.

[11] 4,283,237

[45] Aug. 11, 1981

[54] METHOD OF MAKING A GUN PROPELLANT COMPOSITION

[75] Inventors: Russell Reed, Jr.; Raymond M. Price, both of Ridgecrest, Calif.

[73] Assignee: Thiokol Corporation, Newtown, Pa.

[21] Appl. No.: 565,428

[22] Filed: Apr. 3, 1975

Related U.S. Application Data

[63] Continuation-in-part of Ser. No. 329,258, Jan. 17, 1973, abandoned.

[51] Int. Cl.³ ............................................. C06B 45/10
[52] U.S. Cl. .............................. 149/19.91; 149/19.92; 149/92; 264/3 R
[58] Field of Search ................... 149/19.91, 19.92, 92; 264/3 B

[56] References Cited

U.S. PATENT DOCUMENTS

| | | | |
|---|---|---|---|
| 3,149,012 | 9/1964 | Preckel | 264/3 B X |
| 3,155,749 | 11/1964 | Rossen et al. | 264/3 B |
| 3,322,583 | 5/1967 | Guthrie et al. | 149/19.91 |
| 3,386,868 | 6/1968 | Gimler et al. | 149/92 X |
| 3,427,295 | 2/1969 | Reed | 149/19.91 X |
| 3,520,742 | 7/1970 | Witz | 149/19.91 X |
| 3,725,154 | 4/1973 | McCulloch et al. | 149/92 X |
| 3,770,524 | 11/1973 | Walker et al. | 149/19.91 X |

*Primary Examiner*—Edward A. Miller
*Attorney, Agent, or Firm*—Thomas W. Brennan

[57] ABSTRACT

HMX-containing gun propellants having good thermal stability and mechanical properties are made by mixing HMX with a polymerizable binder, a polyacrylate cross-linking agent and a polymerization catalyst and extruding the mixture into hot water to form cured pellets of propellant. The binder comprises a long chain acrylic monomer of 14 to 24 carbon atoms or a blend of such a long chain monomer and a shorter chain monomer having 6 to 13 carbon atoms. The molar ratio of short chain acrylic monomer to long chain monomer may vary from 0:1 to 3:1.

14 Claims, No Drawings

METHOD OF MAKING A GUN PROPELLANT COMPOSITION

This application is a continuation-in-part of application Ser. No. 329,258 filed Jan. 17, 1973, now abandoned.

This invention relates to the manufacture of propellant compositions suitable for use in forming caseless gun propellant grains and cartridges and more particularly to an improved method of making a gun propellant composition containing a major amount of cyclotetramethylene tetranitramine (HMX). The products of the present method have ballistic properties at least comparable to those of conventional nitrocellulose base gun propellants, such as the improved military rifle smokeless powder hereafter referred to as IMR, and have substantially improved thermal properties, relatively low burning rates and good resistance to water and liquid hydrocarbons.

Rapid firing guns require gun propellants having high thermal stability, low flame temperatures, non-corrosive reaction products, low ash content and good resistance to gasoline, oil and water. Lower propellant flame temperatures result in lower gun chamber and gun barrel temperatures thus permitting the use of lighter metals such as aluminum and magnesium. The higher the thermal stability of the propellant, the less probability there is that self-firing of the round will occur. Less corrosive reaction products result in a longer barrel life of the gun.

Conventional smokeless propellants based on nitrocellulose, e.g., the IMR propellant referred to above, can be extruded into desired shapes to give a limited control of burning rate characteristics but are subject to a number of disadvantages. The principal deficiency of these conventional propellants is their lack of thermal stability. Autocatalytic decomposition of the propellants occurs at a relatively low temperature and thus premature ignition in a hot gun chamber can be avoided only by encasing the propellant grains or pellets in a metal case. Also such conventional propellants lack the necessary mechanical strength and resistance to water, gasoline and oil for use as a caseless cartridge.

Different approaches have been used in the prior art in an effort to overcome these drawbacks, ranging from redesign of the cartridge to the addition of flame suppressants and corrosion protectors as described in U.S. Pat. Nos. 3,658,008; 3,626,851; 3,616,759; 3,598,052; 3,557,700; 3,563,177; and 3,463,086, but none of these approaches has satisfactorily solved the problem. Other patents that disclose gun propellants include U.S. Pat. Nos. 2,995,430; 3,116,190; 3,392,669; 3,209,609; 3,676,233; and 3,673,286, but these patents fail to disclose compositions similar to those of the present invention. Also the rocket propellant art as exemplified by U.S. Pat. Nos. 3,026,672; 3,666,576; 3,629,020; 3,000,718; 3,068,129; 3,532,566; 3,532,567; and 3,625,782 fails to teach a solution of these problems.

It has further been proposed that the problem posed by the relatively poor thermal stability of conventional nitrocellulose base propellants such as the above-mentioned IMR propellant be overcome by using a composite gun propellant comprising a solid high energy component dispersed in a minor amount of an organic polymeric binder. More particularly, it has been suggested that secondary cyclic nitramines, such as cyclotetramethylene tetranitramine (HMX) be used as the energetic component of such a composite propellant. The use of HMX in a composite propellant of this type is advantageous because such propellants have a substantially greater thermal stability and less sensitivity to shock, friction and impact than the IMR type of propellant.

A representative HMX-containing gun propellant having improved thermal stability is disclosed in Gimler et al. U.S. Pat. No. 3,386,868. The compositions disclosed in this patent comprise a major amount of particulate HMX and a minor amount of a polyacrylic rubber binder. The compositions are made by preparing a mixture of HMX, a preformed acrylic rubber and a volatile solvent, extruding the mixture to form a strand, cutting the strand into pellets and heating the pellets to remove solvent and effect a cure of the binder. This process has the disadvantage that it uses a solvent which is difficult to remove after the propellant has been molded and the removal of which either requires expensive recovery equipment or generates a pollution problem.

It is accordingly, an object of the present invention to provide an improved process for making a thermally stable HMX-containing propellant composition. It is another object of the invention to provide a process for making a propellant composition adapted to be used in the manufacture of caseless cartridges, which process does not require the use of an organic solvent. Other objects of the invention will be in part obvious and in part pointed out hereafter.

The present invention is based on applicants' finding that by proper selection of binder components it is possible to formulate a mixture of HMX and a polymerizable binder which can be extruded into a hot water bath to form pellets that polymerize or cure rapidly to yield relatively hard propellant granules. The hot water bath should desirably be purged with nitrogen to preclude the possibility of dissolved oxygen therein interfering with the curing of the binder. As shown in the Examples given below, the cured pellets or granules exhibit good thermal stability and mechanical properties.

More particularly, the objects of the invention can be obtained by using as the curable binder at least one long chain acrylate or methacrylate having from 14 to 24 carbon atoms, or preferably a blend of long chain acrylic monomer with a shorter chain acrylic ester having say 6 to 13 carbon atoms. It has been found that when lower alkyl esters such as ethyl acrylate and methyl methacrylate are used as the second or short chain acrylic binder component, the extruded material does not hold its cylindrical shape but tends to form shapeless balls. Hence the shorter chain acrylic ester should desirably contain at least 6 carbon atoms.

The elasticity or rigidity of the cured binder depends importantly on the nature of the acrylic monomer used. In general, the longer chain acrylate polymers tend to have relatively low glass transition temperatures and rubbery characteristics. The use of short chain acrylate comonomers tends to raise the glass transition temperature of the binder and produce a more rigid binder. The low glass transition temperature of the binder can be partly compensated for by using a cross-linking agent of the type described below. It has been found that the use of a blend of at least one long chain acrylic ester and at least one short chain acrylic ester yields a propellant having improved strain characteristics.

Suitable long chain acrylic monomers are decyl, lauryl, stearyl, and oleyl acrylates and methacrylates. As shorter chain acrylates, the propyl, n-butyl, isobutyl, hexyl, heptyl and 2-ethyl-hexyl-acrylates and methacrylates may be used. The molar ratio of short chain to long chain acrylate may vary from say 0:1 to 3:1 with the preferred ratio being 0.4:1 to 2.5:1. The curable binder components usually comprise from 20% to 35% by weight of the mixture to be extruded.

In preparing the present compositions, a relatively fine particle size HMX is desirably used, preferably an average particle size of 1 to 5 microns. The use of such a small particle size HMX provides a highly energetic propellant having relatively stable burning characteristics. The HMX desirably comprises about 65% to 80% by weight of the mixture.

In addition to the HMX and curable binder components, the mixture to be extruded desirably contains a cross-linking agent and a free radical generating catalyst. Suitable cross-linking agents are trimethylol propane triacrylate, pentaerythritol triacrylate or tetracrylate, glycerol triacrylate, 1,2,4-butanetriol-triacrylate, pentaerythritol tetramethacrylate, ethylene glycol diacrylate and triallyl cyanurate. Any of the conventional free radical catalysts known to be useful in the polymerization of acrylic monomers can be used in the present process. Preferred catalysts include benzoyl peroxide, bis-succinyl peroxide, acetyl peroxide, lauroyl peroxide, t-butyl peroctoate and t-butyl peroxyisobutyrate. The cross-linking agent may be used in an amount of 0.01 to 10% by weight of the mixture and the catalyst may be used in an amount of 0.01 to 5% by weight of the mixture.

Mixing of the ingredients of the extrudable mixture can be carried out in any suitable mixing device, e.g., a Banbury mixer. While the mixing procedure is not critical, it is usually desirable to dissolve the catalyst and cross-linker in the acrylic monomer or monomers and then mix the HMX therewith. The proportions used are such as to give the mixture a dough-like consistency. Extrusion of the mixture can be effected in conventional gun propellant extruding equipment to yield propellant grains having single or multiple perforations if desired. The temperature of the inert gas-purged water bath into which the mixture is extruded may vary from say 50° to 100° C., the preferred temperature being about 90° C. Curing of the extruded material occurs almost immediately as it emerges from the extrusion nozzles.

In order to point out more fully the nature of the present invention, the following specific Examples are given of typical propellants embodying the invention and certain of the properties thereof. In the Examples quantities are given in parts by weight unless otherwise indicated. The autoignition times were determined in accordance with ASTM Method No. 286 and the differential thermal analysis values were determined according to ASTM Method E-14.

EXAMPLE 1

Two HMX-containing propellant compositions (Samples A and B) were made using lauryl methacrylate and stearyl methacrylate, respectively, as the curable binder components, trimethylol propane trimethacrylate as the cross-linking agent and benzoyl peroxide as the catalyst. The compositions had good extrusion properties and cured rapidly when extruded into hot water at 60° C. The properties of components in the curable composition in parts by weight are given in Table I below, together with the thermal stability values for the two compositions and the comparative thermal stability values of an IMR smokeless powder.

TABLE I

| Component | A | B | IMR Smokeless |
|---|---|---|---|
| Lauryl methacrylate | 23.75 | — | — |
| Stearyl methacrylate | — | 23.75 | — |
| Trimethylolpropane trimethacrylate | 1.25 | 1.25 | — |
| Benzoyl peroxide | 0.125 | 0.125 | — |
| HMX (2 micron diameter) | 75.00 | 75.00 | — |
| Thermal Stability: | | | |
| Autoignition Time (550° F.), sec. | 15 | 17 | 2.6 |
| Autoignition Time (450° F.), sec. | >600 | >1,500 | 7.2 |
| Differential Thermal Analysis, °F. | 520 | 520 | 370 |

EXAMPLE 2

Two HMX-containing propellant compositions (A and B) were made as described in Example 1 using blends of lauryl methacrylate (LMA) and isobutyl acrylate (IBA) as the binder components. The formulations are given in Table II below.

TABLE II

| Component | (A) | (B) |
|---|---|---|
| LMA | 17.04 | 12.03 |
| IBA | 7.65 | 12.61 |
| LMA/IBA Mol Ratio | 1:1 | 3:7 |
| Trimethylol propane trimethacrylate | 0.30 | 0.38 |
| Benzoyl peroxide | 0.25 | 0.25 |
| HMX (2 micron dia.) | 75.00 | 75.00 |
| Shore A Hardness | 95 | 75 |
| Physical Nature | Can be sliced | Can be sliced |

The compositions of Table II exhibited good extrusion properties and acceptable hardness values. Samples of the propellant 0.030 inches thick were cut and tested to determine their autoignition time at 550° F. and differential thermal analysis temperature in °F. The results are given below in Table III with values for a smokeless powder IMR 4064 given for purposes of comparison.

TABLE III

| Test | (A) | (B) | IMR 4064 |
|---|---|---|---|
| Autoignition time at 550° F. | 24.5 | 21.7 | 2.6 |
| Differential Thermal Analysis Temperature | 515° | 515° | 370° |

EXAMPLE 3

Extrudable HMX-containing propellant mixtures were prepared having the following formulations:

TABLE IV

| Component | (A) | (B) |
|---|---|---|
| Lauryl methacrylate | 24.43 | 12.03 |
| Isobutyl acrylate | 0 | 12.61 |
| Trimethylol propane trimethylacrylate | 0.57 | 0.76 |
| Benzoyl peroxide | 0.25 | 0.25 |
| HMX (2 micron dia.) | 75.00 | 75.00 |

These formulations exhibited good extrusion properties. When extruded from a 0.062 inch diameter orifice into nitrogenpurged hot water at a temperature of about 100° C., they cured immediately in the original extruded cylindrical shape with diameters of 0.054 and 0.062, respectively.

It is, of course, to be understood that the foregoing Examples are intended to be illustrative only, and that numerous changes can be made in the ingredients, proportions and conditions specifically disclosed without departing from the spirit of the invention as defined in the appended claims.

We claim:

1. The method of making a propellant which comprises preparing an extrudable mixture consisting essentially of a major amount of cyclotetramethylene tetranitramine and a minor amount of a curable binder, said binder comprising at least one alkyl acrylate or alkyl methacrylate of 14 to 24 carbon atoms, a polyacrylate cross-linking agent and a free radical catalyst, and extruding said mixture into hot water at a temperature sufficient to cure said binder and to form cured pellets of said propellant.

2. The method of making a propellant which comprises preparing an extrudable mixture consisting essentially of a major amount of cyclotetramethylene tetranitramine and a minor amount of a curable binder, said binder being a mixture of acrylate monomers comprising a first alkyl acrylate or alkyl methacrylate having 14 to 24 carbon atoms and a second alkyl acrylate or methacrylate having 6 to 13 carbon atoms, the molar ratio of said second acrylate to said first acrylate being from 0:1 to 3:1, a polyacrylate cross-linking agent and a free radical catalyst and extruding said mixture into hot water at a temperature sufficient to cure said binder and to form cured pellets of said propellant.

3. The method of making a propellant which comprises preparing an extrudable mixture consisting essentially of a major amount of cyclotetramethylene tetranitramine and a minor amount of a curable binder, said binder being a mixture of acrylate monomers comprising a first alkyl acrylate or alkyl methacrylate having 14 to 24 carbon atoms and a second alkyl acrylate or alkyl methacrylate having 6 to 13 carbon atoms, the molar ratio of said second acrylate to said first acrylate being from 0.4:1 to 2.5:1, a polyacrylate cross-linking agent and a free radical catalyst, and extruding said mixture into hot water at a temperature sufficient to cure said binder and to form cured pellets of said propellant.

4. A method according to claim 1 wherein said hot water is at a temperature of 90° to 100° C.

5. A method according to claim 1 wherein said curable binder comprises isobutyl acrylate and lauryl methacrylate.

6. A method according to claim 5 wherein the ratio of isobutyl acrylate to lauryl methacrylate is between 0.4:1 and 2.5:1.

7. A method according to claim 1 wherein said cross-linking agent is trimethylolpropane triacrylate.

8. A method according to claim 1 wherein said catalyst is an organic peroxide catalyst.

9. A method according to claim 8 wherein said catalyst is benzoyl peroxide.

10. A method according to claim 1 wherein said mixture contains from 65% to 80% by weight of cyclotetramethylene tetranitramine.

11. A method according to claim 1 wherein said cyclotetramethylene tetranitramine has a particle size of 1 to 5 microns.

12. A method according to claim 1 wherein said cross-linking agent is present in said extrudable mixture to the extent of 0.01 to 10% by weight.

13. A method according to claim 1 wherein said catalyst is present in said extrudable mixture to the extent of 0.01 to 5% by weight.

14. A propellant in pellet form made by the method of claim 2.

* * * * *